United States Patent Office 3,505,577
Patented Apr. 7, 1970

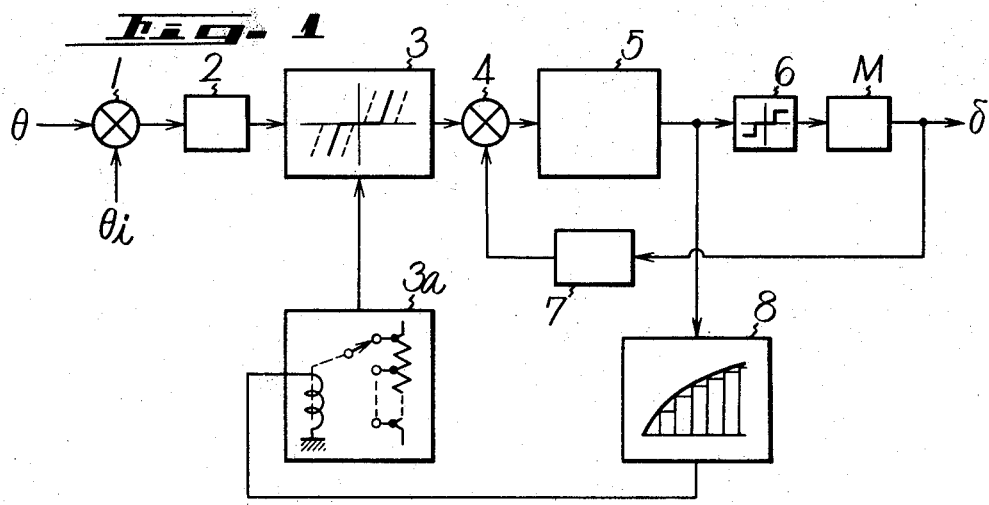
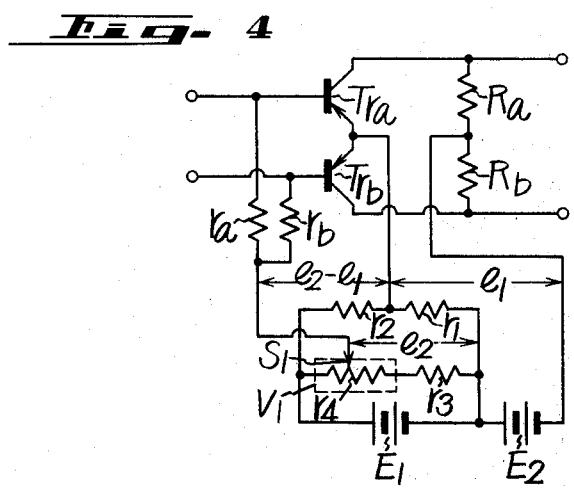
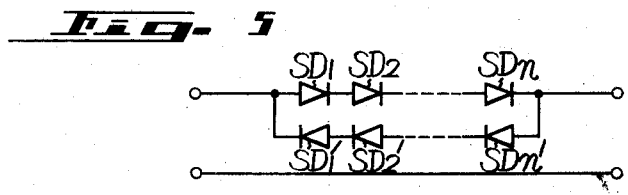
INVENTOR.
*Yoichi Hirokawa*
BY ATTORNEYS

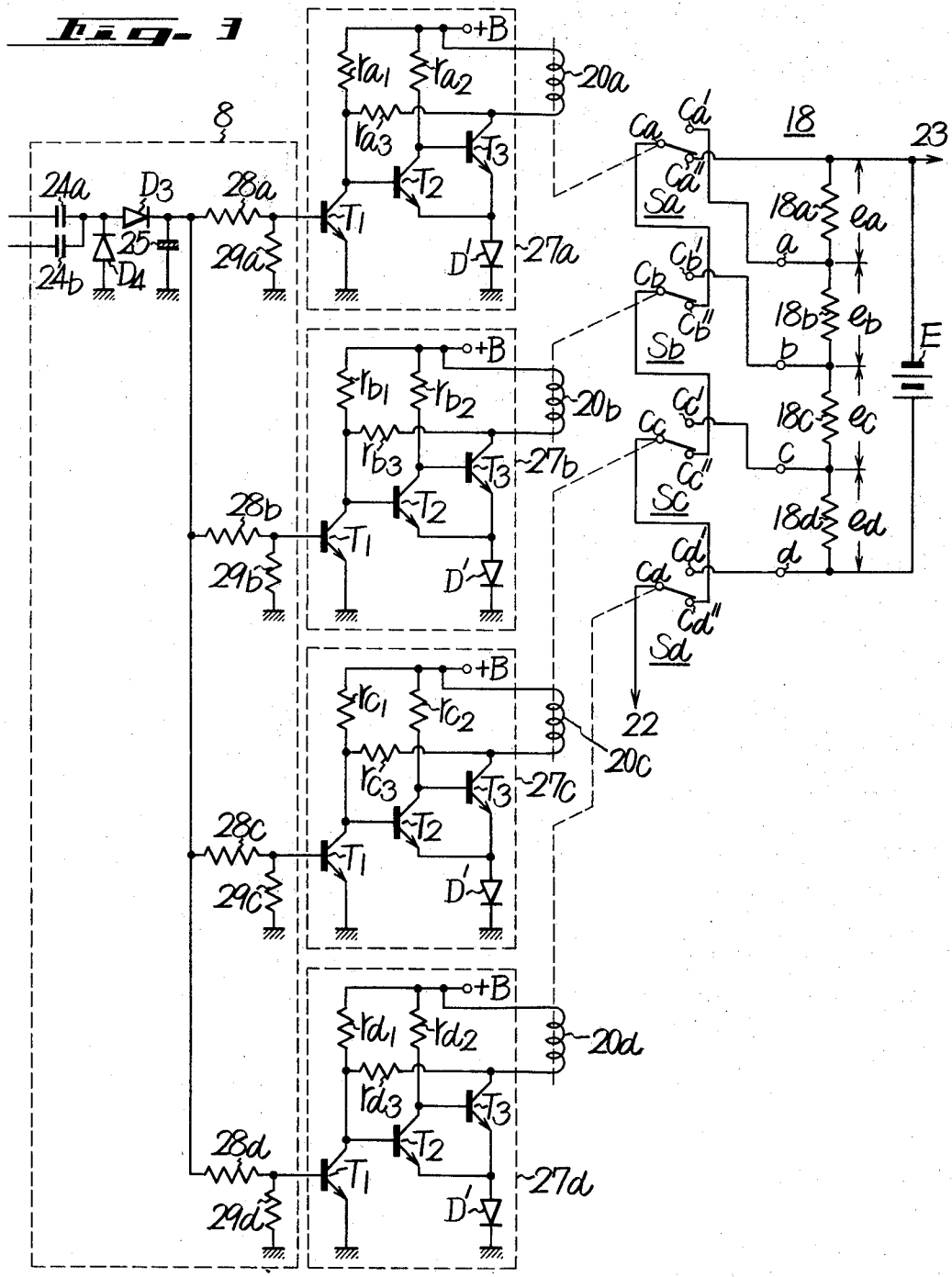

3,505,577
ADAPTIVE CONTROL FOR SHIP STEERING WHEREBY SYSTEM IS LESS SENSITIVE IN ROUGH SEA
Yoichi Hirokawa, Tokyo, Japan, assignor to Kabushiki-kaisha Tokyo Keiki Seizosho (Tokyo Keiki Seizosho Co., Ltd.), Tokyo, Japan, a corporation of Japan
Filed Apr. 4, 1967, Ser. No. 628,441
Claims priority, application Japan, Apr. 13, 1966,
41/23,335
Int. Cl. G05b 11/01
U.S. Cl. 318—18         6 Claims

ABSTRACT OF THE DISCLOSURE

An automatic pilot system having a plurality of elements for automatically controlling a vehicle to travel along a set course, said automatic pilot system including means for producing an electrical signal corresponding to the number of steering operations of the vehicle in relation to time and other means for determining a steering response sensitivity of the system in accordance with the electrical signal.

BACKGROUND OF THE INVENTION

Field of the invention

The present invention relates to an automatic pilot system for a moving vehicle including an element for detecting the number of steering operations of the vehicle with respect to time and means for controlling the steering number of the vehicle in connection with the element.

Description of the prior art

A conventional automatic pilot system having a plurality of elements for automatically controlling a vehicle to travel along a set course, in which there occurred defects such, for example, as the steering device of the vehicle being reduced in life because of useless operation of the steering device and accordingly the vehicle having consumed unnecessary fuel.

SUMMARY OF THE INVENTION

The present invention relates to an automatic pilot system which includes a first means for producing an electrical signal corresponding to the number of steering operation of a vehicle with respect to time and a second means controlled by the first means to determine a steering response sensitivity of said system, said first and second means being not employed in the conventional automatic pilot system. Due to utilization of said first and second means defects such, for example, as reducing of life of the steering device of the vehicle and unnecessary consumption of fuel can be avoided.

BRIEF DESCRIPTION OF THE DRAWING

FIGURE 1 is a block diagram showing the fundamental construction of an automatic pilot system of this invention;

FIGURE 3 is a connection diagram illustrating in detail some particular parts of the system exemplified in FIGURE 2;

FIGURES 4 and 5 are connection diagrams schematically showing other examples of the part depicted in FIGURE 3.

DESCRIPTION OF THE PREFERRED EMBODIMENTS

Figure 2:
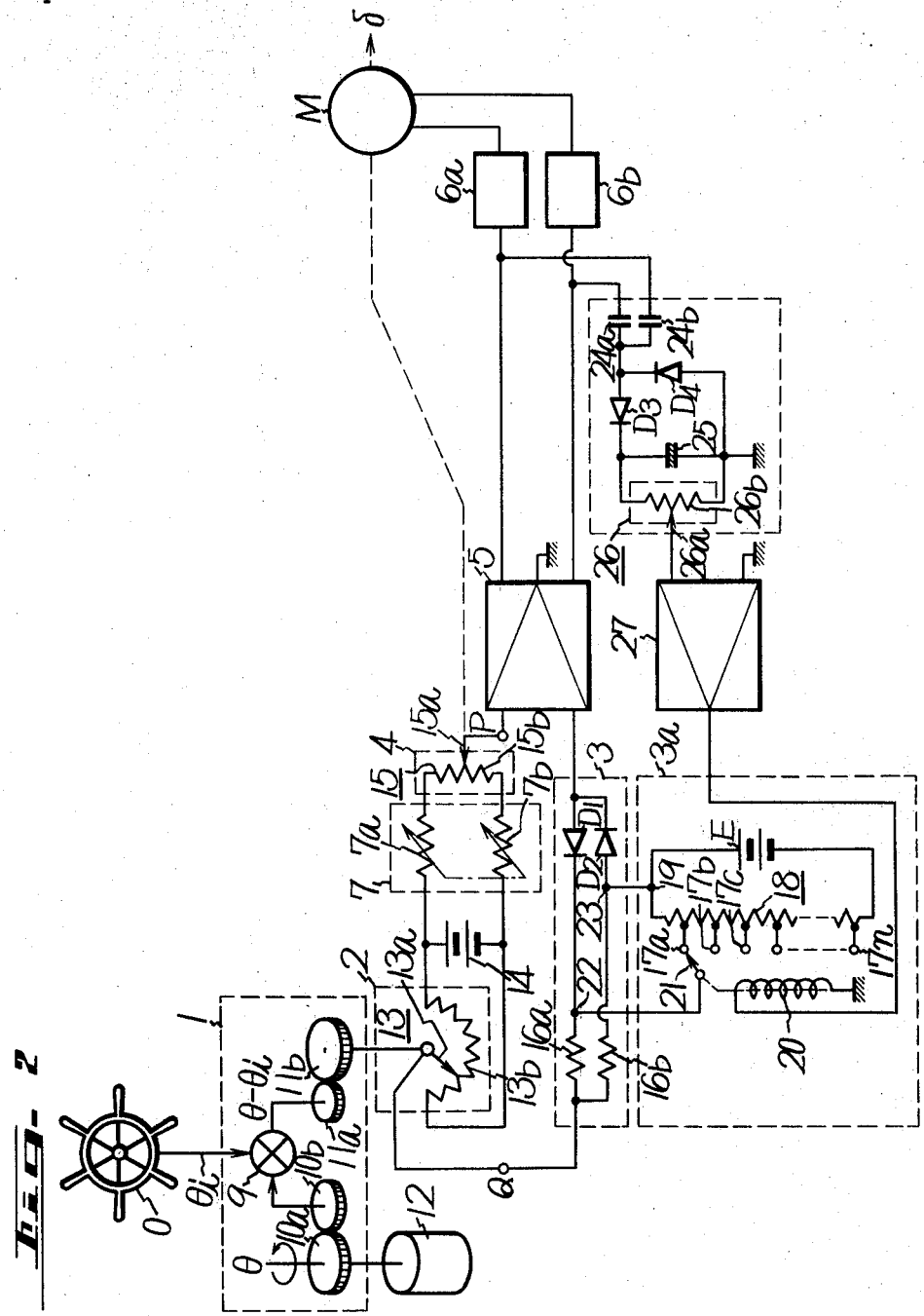
FIGURE 2 is a connection diagram schematically illustrating one example of the automatic pilot system embodying the principles of this invention.

In order to facilitate a better understanding of this invention, a description will be given in connection with the prior art.

With the use of a conventional autopilot of this type, abuse of the helm is unavoidable in handling a ship to make exactly a straight advance in a high sea. Generally, a ship on sailing yaws about its set course substantially periodically under the influence of external disturbances such as waves and winds and a compass loaded on the ship feeds a signal to the autopilot in response to the yawing, by which a steering operation is automatically carried out to follow the set course. In practice, however, the response period of the ship to the steering operation resulting from yawing is usually far longer than the yawing period, so that the ship does not answer the steering operation of a period shorter than a certain value. That is, steering operations of a period shorter than the specific response period of the ship are all of no use in actual steering of the ship. In fact, the response time of a ship from a steering operation to an actual change of its course is sometimes, for example, as long as 30 seconds, so that even if steering operations are repeated at intervals of, for example, 3 seconds, shorter than the response time of the ship, the ship cannot respond to the subsequent steering operations. Namely, the steering operations of a period of 3 seconds or so are quite useless for the correction of the ship's heading. Further, drag to the ship resulting from the useless steering operations causes power loss of the ship, which leads to unnecessary fuel consumption and wear of associated machines, especially shortening of the life of the helm. In addition, the fluid resistance against the ship due to the movement of the rudder increases in proportion to the square of a rudder angle, and hence the loss due to the useless steering operations becomes very great. Since the driving source of the ship, namely the screw propeller is naturally designed to secure the maximum of efficiency when the rudder angle is zero, every steering operation causes a great reduction in efficiency of the driving power of the ship. Therefore, it is very desirable from any viewpoints to minimize the aforementioned useless steering operations which are ineffective for maintaining the ship in its set course.

In order to avoid such disadvantages as described above, there has heretofore been proposed the so-called weather adjustment device adapted such that as long as the actual ship's heading stays within an allowance limit determined about a set course in a rough sea no steering operations take place. However, since adjustment of such a conventional device is manually made by an operator on his judgement as to everchanging conditions of the sea, the ship and so on, the operator is always required to observe the conditions of the sea, frequency of steering operations. It naturally requires a considerable amount of skill and imposes a great strain on the operator. Furthermore, such an observation is subject to each operator's individual difference in judgement as to the aforementioned conditions, so that steering performance of the ship is likely to greatly vary according to operators, and hence it is almost impossible in practice to make the optimum weather adjustment in accordance with continual changes of the disturbances.

Accordingly, one object of this invention is to provide an automatic pilot system capable of making the optimum weather adjustment in response to everchanging external disturbances.

Another object of this invention is to provide an automatic pilot system in which the number of steering operations is detected in relation to time and is controlled by the detected signal in relation to time.

Still another object of this invention is to provide an automatic pilot system in which the number of steering operations are detected in relation to time and the circuit zone or gain of a sensitive control device or the time constant of a filter of an automatic steering control system is adjusted by the detected signal to automatically control the number of the steering operations in relation to time.

Still a further object of this invention is to provide an automatic pilot system in which the number of steering operations are detected in relation to time and the circuit constants are selectively changed over by the detected signal and the dead zone or gain of a sensitive control device or the time constant of a filter of an automatic steering control system is adjusted in accordance with the selected circuit constant to automatically control the number of the steering operations in relation to time.

In FIGURE 1 there is illustrated the fundamental construction of the automatic pilot system of this invention. The actual course $\theta$ of the ship obtained by a gyrocompass and a set course $\theta_1$ are compared in an adder 1 and the deviation $(\theta-\theta_1)$ between the courses $\theta$ and $\theta_1$ is converted into a corresponding electrical signal by a detector-converter 2, thereafter being applied to a sensitive control device such, for example, as a dead-zone circuit 3. The dead zone band of the dead-zone circuit 3 is adjustably set by an adjusting device 3a in such a manner as to conduct only when the aforementioned deviation $(\theta-\theta_1)$ or the value of the electrical output from the detector-converter 2 exceeds a predetermined band of the dead-zone circuit 3. When the deviation $(\theta-\theta_1)$ or the electrical output emanating from the detector-converter 2 in response to the deviation exceeds the predetermined band, it is applied to a relay unit 6 through the dead-zone ciricut 3, an adder 4 and an amplifier circuit 5 to operate the relay unit 6, and as a result, a servomotor M is actuated. This provides a rudder angle $\delta$ from the servomotor M corresponding to the deviation $(\theta-\theta_1)$ and the actual ship's heading $\theta$ is corrected to agree with the set course $\theta_1$. In this case, the rotational angle of the servomotor M for providing the rudder angle $\delta$ is fed back through a feedback system 7 to the adder 4 to control it in a manner such as to decrease the input signal to the amplifier circuit 5. As a result of this, the servomotor M is controlled so as not to rotate an angle larger than that for the rudder angle $\delta$, by which the rudder angle $\delta$ is prevented from exceeding the angle corresponding to the deviation $(\theta-\theta_1)$.

Meanwhile, the dead zone of the aforementioned dead-zone circuit 3 should be settled in consideration of the conditions of the sea and the number of steering operations taken in response to the particular conditions of the sea. In this invention, taking account of the fact that the output signal from the amplifier circuit 5 is representative of the number of the steering operations, one portion of the output signal of the amplifier circuit 5 is applied to a counter circuit 8 by which the number of the steering operations is detected in relation to time, and the detected signal is applied to the adjusting device 3a to set the dead zone band of the dead-zone circuit 3. Thus, the number of the steering operations is held within a predetermined value so as not to cause an unnecessary increase in the number of the steering operations under foul weather. This prevents abuse of the helm and eliminates various drawbacks experienced in the prior art, ensuring economization of the navigation of the ship.

The foregoing has described the fundamental construction of this invention with reference to FIGURE 1. In order to facilitate a better understanding of this invention, the following will describe one example of this invention in connection with FIGURE 2, in which components similar to those in FIGURE 1 are identified by similar reference numerals for convenience of illustration.

In the present example an adder 1 comprises a differential gear 9, a pair of gears 10a, 10b and another pair of gears 11a, 11b related to the differential gear 9. The actual ship's heading $\theta$ fed from a repeater 12 of a gyrocompass is applied to one input shaft of the differential gear 9 through the gears 10a and 10b, while the other input shaft of the differential gear 9 is supplied with the set course $\theta_1$ which is established when a steering wheel 0 is operated by an automatic pilot mechanism, and the deviation $(\theta-\theta_1)$ is obtained from the output shaft of the differential gear 9. The shaft of the gear 11b has coupled therewith a needle 13a of a detector-converter 2 consisting of a potentiometer 13, and a DC power source 14 is connected to both ends of a resistor 13b of the potentiometer 13. In addition, both ends of a resistor 15b of another potentiometer 15 are connected respectively through variable resistors 7a and 7b to the power source 14 in parallel to the resistor 13b of the potentiometer 13. A circuit 7 constituted by the variable resistors 7a and 7b corresponds to the feedback system 7 shown in FIGURE 1 and the potentiometer 15 corresponds to the adder 4 depicted in FIGURE 1. Further, a needle 15a of the potentiometer 15 is connected to one input terminal of an amplifier circuit 5 and the needle 13a of the detector-converter 2 is connected to the other input terminal of the amplifier circuit 5 through a dead-zone circuit 3. As shown in the figure, the dead-zone circuit 3 employs two diodes $D_1$ and $D_2$, in which the anode of the former and the cathode of the latter are connected to each other and their connecting point is connected to the aforementioned other input terminal of the amplifier 5. Meanwhile, the other opposite electrodes of the diodes $D_1$ and $D_2$ are also connected to each other through resistors 16a and 16b and the needle 13a is connected to the connecting point of the resistors 16a and 16b. Further, a resistor 18 having a plurality of fixed contacts 17a, 17b, 17c . . . 17n is connected between both electrodes of a DC power source E, and a connecting point 19 between the negative electrode of the D.C. power source E and the resistor 18 is connected to a connecting point 23 between the anode of the diode $D_2$ and the resistor 16b. While, a movable contact 21, actuated by a relay coil 20 to respectively engage with the plurality of fixed contacts 17a, 17b, 17c . . . 17n of the resistor 18, is connected to a connecting point 22 between the resistor 16a and the cathode of the diode $D_1$, by which a bias is applied to each of the diodes $D_1$ and $D_2$ in a reverse direction. As a result of this, the voltage of the power source E is divided by the resistor 18 to produce divided voltage $e$, by which a current is produced to flow in the resistors 16a and 16b. Thus, a voltage drop of approximately $e/2$ is caused in the respective resistors. These voltage drops serve as reversed bias voltages for the diodes $D_1$ and $D_2$, so that these diodes $D_1$ and $D_2$ are held non-conductive in their reverse biased condition. The relay coil 20 is grounded at one end and connected at the other end to an amplifier circuit 27. With such an arrangement, where the needle 13a of the detector-converter 2 is rotated in response to the deviation $(\theta-\theta_1)$, positive or negative potential corresponding to the relative positions of the needles 13a and 15a appears between a connecting point P of the needle 15a and the amplifier circuit 5 and a connecting point Q of the needle 13a and the dead-zone circuit 3 due to the interposition of the DC power source 14 between the potentiometers 13 and 15. When the potential different between these points exceeds the voltage across the aforementioned resistor 16a or 16b, the diode $D_1$ or $D_2$ becomes conductive in accordance with positive or negative of the potential difference, and the potential difference is applied as an input signal to the amplifier circuit 5. In accordance with the polarity of the input signal a relay 6a or 6b connected to the output side of the amplifier circuit 5 is actuated by the output of the amplifier circuit 5 to cause a servomotor M to rotate at an angle corresponding to the aforementioned deviation $(\theta-\theta_1)$, thus providing an instruction rudder angle $\delta$, the relay 6a corresponding to, for example, starboard rudder and the relay 6b, for example, the port rudder. In order that the instruction rudder angle $\delta$ thus obtained may not exceed the value corresponding to the deviation $(\theta-\theta_1)$ due to further rotation of the servomotor M, the needle 15a of the potentiometer 15 is shifted by the rotation of the servomotor M to decrease the potential difference between the points P and Q. This causes the dead-zone circuit 3 to be non-conductive to prevent the application of the input signal to the amplifier circuit 5, with the result that the rotation of the servomotor M is stopped immediately after obtaining the aforementioned instruction rudder angle $\delta$. The circuit 7 consisting of the variable resistors 7a and 7b serves to change the displacement ratio of the needles 13a and 15a of the potentiometers 13 and 15, namely the rudder angle ratio.

Meanwhile, a counter circuit 8 is connected to the output side of the amplifier circuit 5 as previously described with FIGURE 1, and the counter circuit 8 may be, for example, a storage-type counter circuit such as shown in FIGURE 2. As depicted in the figure, a pair of capacitors 24a and 24b are connected to each other at one end, and the anode of a diode $D_3$, whose cathode is grounded through a fixed resistor element 26b of a variable resistor 26, and the cathode of a diode $D_4$ whose anode is grounded are connected to the connecting point between the capacitors 24a and 24b. Further, a charging capacitor 25 is interposed between the cathode of the diode $D_3$ and the ground in parallel to the variable resistor 26. The other ends of the pair of capacitors 24a and 24b serve as input terminals of the counter circuit 8 and these input terminals are connected to the output side of the amplifier circuit 5 at the preceding stage of the relays 6a and 6b. The capacitor 25 accumulates the charge supplied with the output of the amplifier circuit 5 through the capacitors 24a and 24b and the diode $D_3$. A slider 26a of the variable resistor 26 is used as an output terminal of the counter circuit 8 and is connected through the amplifier circuit 27 to one end of the relay coil 20 of the dead-zone circuit 3.

Referring now to FIGURE 3, a description will be given in connection with one example of means for establishing the dead zone of the above-described dead-zone circuit 3. In the figure the means comprise four amplifiers 27a, 27b, 27c and 27d, each consisting of, for example, three transistors $T_1$, $T_2$ and $T_3$ connected in series, these amplifier circuits collectively corresponding to the amplifier circuit 27 in FIGURE 2. Since these amplifier circuits are exactly the same in construction, one of them, for instance, 27a will hereinbelow be described in detail. A positive power source B is connected through a resistor $r_{a1}$ to the connecting point between the collector of the transistor $T_1$ and the base of the transistor $T_2$, while the emitter of the transistor $T_1$ is grounded. The aforementioned positive power source B is also connected through a resistor $r_{a2}$ to the connecting point between the collector of the transistor $T_2$ and the base of the transistor $T_3$, while the emitters of the transistors $T_2$ and $T_3$ are connected to each other and grounded through a diode $D'$. Between the collector of the transistor $T_3$ and the power source B a relay coil 20a is inserted, and further the collector of the transistor $T_3$ is connected through a resistor $r_{a3}$ to the connecting point between the collector of the transistor $T_1$ and the base of the transistor $T_2$. Upon the application of a current to the base of the transistor $T_2$ through the resistor $r_{a1}$ from the power source B, the base current of the transistor $T_2$ becomes saturated and the transistor $T_2$ becomes conductive between its collector and emitter. This leads to shorting of the base and emitter of the transistor $T_3$ and prevents a current from flowing into the base of the transistor $T_3$. Therefore, in this case the transistor $T_3$ still remains in the off-state, so that the relay 20a is not energized which is a load of the transistor $T_3$. Under such conditions, in the presence of a positive input to the base of the transistor $T_1$ the transistor $T_1$ is put in the on-state, and hence the transistor $T_2$ is put in the off-state, since its base is grounded. As a result of this, a base current is fed to the base of the transistor $T_3$ from the power source B through the resistor $r_{a2}$ to put the transistor $T_3$ in the on-state, and hence the relay coil 20a is energized. In this case, a positive feedback is applied from the collector of the transistor $T_3$ to the base of the transistor $T_2$ through the resistor $r_{a3}$ so that in the process of the aformentioned operations of the circuit the transistors $T_2$ and $T_3$ are switched directly from the on-state to the off-state. Accordingly, the amplifier circuit 27a performs the function of a relay. The diode $D'$ serves as a reverse bias power source for the transistors $T_2$ and $T_3$ when the transistor $T_2$ or $T_3$ becomes non-conductive and this diode $D'$ serves to positively maintain them in the off-state even under their high temperature condition.

The output of the charging capacitor 25 of the counter circuit 8 is fed to the input sides of the amplifier circuits 27a, 27b, 27c and 27d respectively through respective resistors 28a and 29a, 28b and 29b, 28c and 29c, and 28d and 29d, while the relay coils 20a, 20b, 20c and 20d are connected to the output sides of the amplifier circuts 27a, 27b, 27c and 27d, these relay coils corresponding collectively to relay coil 20 shown in FIGURE 2. The relay coils 20a, 20b, 20c and 20d are respectively adapted to actuate movable contacts Ca, Cb, Cc and Cd of switches, Sa, Sb, Sc and Sd. Make contacts Ca', Cb' Cc' and Cd' of the switches Sa, Sb Sc and Sd are connected respectively to terminals a, b, c and d of a resistor 18 consisting of resistors 18a, 18b, 18c and 18d connected in series and corresponding to the resistor 18 shown in FIGURE 2. A break contact Ca" of the switch Sa is connected to one end of the resistor 18, the movable contact Ca of the switch Sa is connected to a break contact Cb" of the switch Sb, the movable contact Cb of the switch Sb is connected to a break contact Cc" of the switch Sc, and the movable contact Cc of the switch Sc is connected to a break contact Cd" of the switch Sd respectively. In addition, both ends of the resistor 18 are connected to the power source E, and the movable contact Cd of the switch Sd and the connecting point between the resistor 18 and the cathode of the power source E are connected respectively to the connecting points 22 and 23 shown in FIGURE 2. The values of the resistors 29a, 29b, 29c and 29d are selected to be sequentially smaller, by which voltage drops in the resistors 29a, 29b, 29c and 29d based upon the charging voltage of the charging capacitor 25 of the counter circuit 8, namely bias voltages fed to the transistors $T_1$ of the amplifier circiuts 27a, 27b, 27c and 27d become sequentially smaller. Consequently, when the charging voltage of the charging capacitor 25 of the counter circuit 8 reaches a predetermined value, the amplifier circuit 27a firstly becomes conductive to actuate the relay coil 20a to engage the movable contact Ca of the switch Sa with the make contact Ca' and, as a result, a voltage ea across the resistor 18a is applied between the connecting points 22 and 23 shown in FIGURE 2, thus establishing a dead zone band. Under such conditions, when the charging voltage of the charging capacitor 25 of the counter circuit 8 rises, namely the number of the steering operations increases, the amplifier circuits 27b becomes conductive, together with the amplifier circuits 27a, to actuate the relay coil 20b, together with the relay coil 20a, to put the movable contact Cb of the switch Sb into engagement with the make contact Cb', disconnecting the movable contact Ca of the switch Sa from the break contact Cb" of the switch Sb. Consequently, a voltage ea+eb across the resistors 18a and 18b is applied between the connecting points 22 and 23 in FIGURE 2, thus establishing a dead zone band. In a like manner, a further increase in the charging voltage of the charging capacitor 25 of the counter circuit 8 causes the amplifier circuit 27c to become also conductive to actuate the relay coil 20c, by which the movable contact Cc of the switch Sc is engaged with the make contact Cc' and a voltage ea+eb+ec respective across the resistors 18a, 18b and 18c is impressed between the connecting points 22 and 23 in FIGURE 2, thus establishing a dead zone band. When the charging voltage of the charging capacitor 25 further rises, the amplifier circuit 27d similarly becomes conductive to actuate the relay coil 20d to engage the movable contact Cd of the switch Sd with the make contact Cd', by which a voltage across the resistor 18 or the voltage of the power source E is applied between the connecting points 22 and 23, providing a dead zone band. In this manner, the number of the steering operations is detected in relation to the time defined by the time constant which are determined in accordance with the charging capacitor 25 of the counter circuit 8, and the resistors 28a to 28d and 29a to 29d, and the relay coils 20a to 20d are actuated in accordance with the level of the detected outputs, which the dead zone band of the dead-zone circuit 3 can be provided.

The foregoing example employs as the counter circuit 8 an integration circuit having a leakage due to the capacitor and the resistors. This type of integration circuit is low in cost and is high in precision enough to serve the purpose of this invention, however, it is, of course, possible for enhancement of precision to use a digital-type device employing a conventional flip-flop circuit, a decatron or the like.

Further, the sensitive control device employed in the foregoing example is the dead-zone circuit of the type that the diodes are suitably reverse-biased, but it may be replaced with any of several examples such as will hereinbelow be described.

With reference to the drawings the several examples of the sensitive control device will be described in detail. FIGURE 4 illustrates an example which utilizes reverse bias of a transistor. In the figure reference characters $Tra$, $Trb$ indicate PNP-type transistors, whose base electrodes serve as input terminals, whose emitter electrodes connected directly to each other and whose collector electrodes serve as output terminals. Reference character $E_1$ designates a bias power source for the both transistors, and the base electrodes of the transistors are connected to a slider $S_1$ of a variable resistor $V_1$ through bias resistors $r_a$ and $r_b$ respectively. Reference characters $r_1$, $r_2$ and $r_3$ identify bias-voltage dividing resistors, and the resistors $r_1$ and $r_2$ are connected in series to each other, whose both ends are connected to the power source $E_1$. Reference character $r_4$ designates a fixed resistor of the variable resistor $V_1$ for controlling the base biases of the transistors $Tra$ and $Trb$. The voltage dividing resistor $r_3$ is connected in series to the fixed resistor $r_4$ and these resistors $r_3$ and $r_4$ are connected to the power source $E_1$ in parallel to the resistors $r_1$ and $r_2$. Reference letters $Ra$ and $Rb$ represent load resistors on the output side of the transistors $Tra$ and $Trb$ and the load resistors $Ra$ and $Rb$ are connected in series to each other and are connected between the collector electrodes of the transistors $Tra$ and $Trb$. Reference character $E_2$ indicates a common collector power source for the transistors $Tra$ and $Trb$, the negative electrode of the power source $E_2$ being connected to the connecting point between the resistors $Ra$ and $Rb$ and the positive electrode being connected to the negative electrode of the power source $E_1$. Meanwhile, the connecting point between the resistors $r_1$ and $r_2$ is connected to that between the emitter electrodes of the transistors $Tra$ and $Trb$. For convenience of illustration, a voltage across the resistor $r_1$ and a voltage between the resistor $r_3$ and the contact point of the resistor $r_4$ with the slider $S_1$ will herein be referred to as $e_1$ and $e_2$ respectively. If now the position of the slider $S_1$ is set so as to obtain the condition $e_1 < e_2$, a reverse bias is applied between the base and emitter of the transistors $Tra$ and $Trb$ which makes the base positive and the emitter negative, causing the both transistors to be non-conductive. Therefore, in the absence of a signal having a voltage greater than $(e_2-e_1)$ and a level high enough to impress a forward bias to the transistor $Tra$, the transistor $Tra$ is held in its inoperative condition. The value of the reverse bias can be made variable by changing the contact point of the resistor $r_4$ with the slider $S_1$. Upon reversal of the polarity of the input signal a similar operation can be carried out by the transistor $Trb$. Namely, the same operations as in the dead-zone circuit 3 shown in FIGURE 2 can be accomplished by the circuit exemplified in FIGURE 4.

The sensitive control device depicted in FIGURE 4 utilizes one portion of the amplifier circuit and hence serves as one portion of the amplifier circuit of the autopilot. Therefore, the use of this circuit simplifies the entire construction of the apparatus and lowers the manufacturing cost thereof.

FIGURE 5 illustrates another example of the sensitive control device, which generally makes use of the forward voltage drop of a semiconductor. In the figure, reference characters $SD_1$, $SD_2$ ... $SD_n$ indicate a plurality of diodes connected in series to one another in the same direction and $SD_{1'}$, $SD_{2'}$ ... $SD_{n'}$ a plurality of diodes similarly connected in series to one another in the same direction. These two groups of the diodes of series connection are connected in parallel to each other in opposite directions, the one connecting point serving as an input terminal and the other as an output terminal. These input and output terminals are combined with those of other circuits in practical use. In this case, the same results as in the foregoing can be obtained by connecting in series diodes of a number proportionate to a desired dead zone band. For example, a silicon diode has a forward voltage drop of approximately 0.7 volt and a germanium diode has a forward voltage drop of about 0.2 volt.

Figure 6:
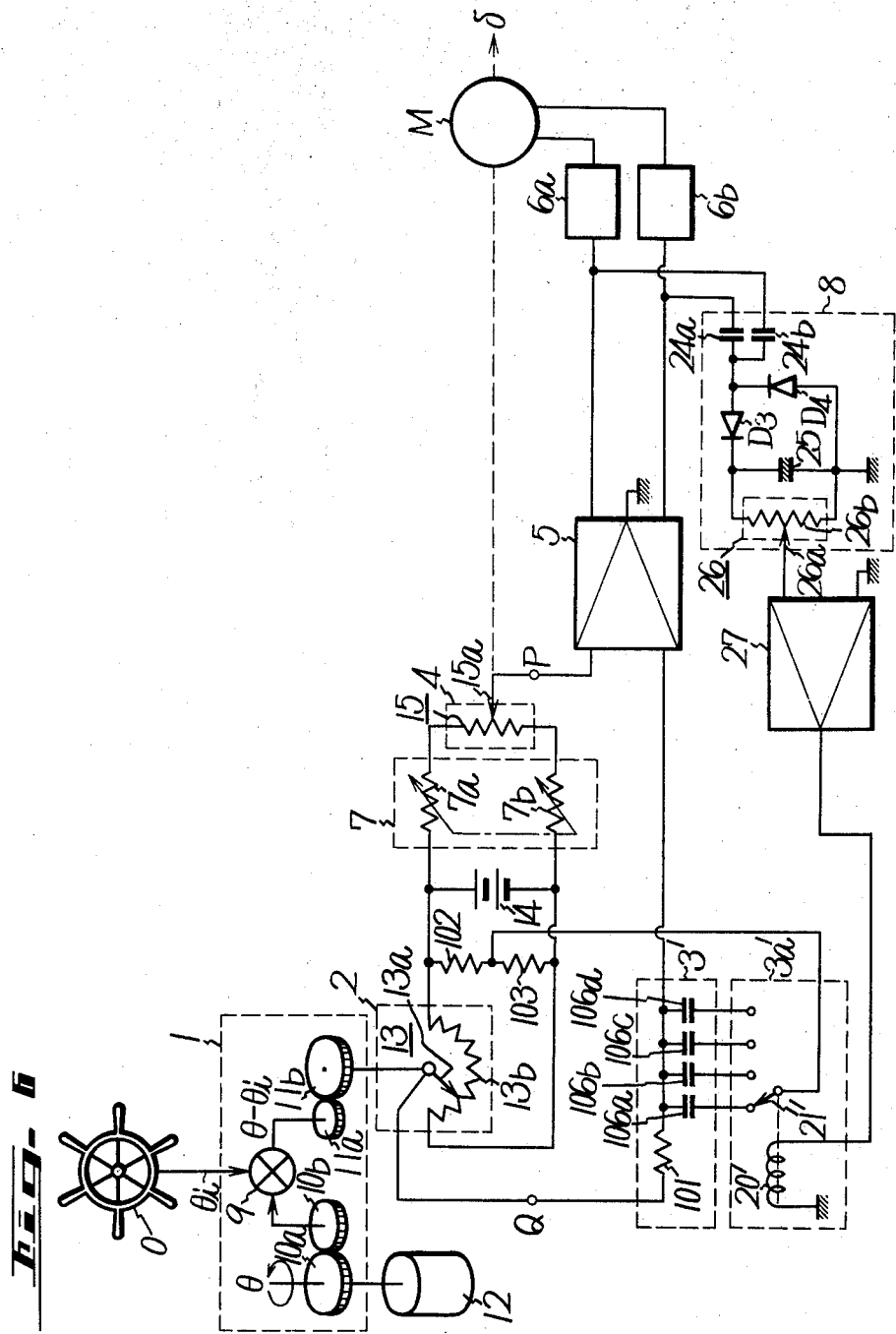
FIGURE 6 is a block diagram, similar to FIGURE 2, illustrating another example of the automatic pilot system employing still another modified form of the parts shown in FIGURE 3.

FIGURE 6 illustrates another example of an automatic pilot system of the present invention, especially still another example of the sensitive control device in which components similar to those in FIGURES 1 and 2 are marked with the same reference numerals, and no description will be given thereon for the sake of brevity. The sensitive control device illustrated in the figure comprises a low-pass filter 3' and an adjusting device 3a'. The low-pass filter 3' consists of a resistor 101 connected at one end to a needle 13a of a potentiometer 13 and a plurality of capacitors, for example, 106a, 106b, 106c and 106d each connected at one end to the other end of the resistor 101. The other ends of the capacitors serve as change-over contacts. The other end of the resistor 101 is connected to one input terminal of an amplifier circuit 5. Meanwhile, the adjusting device 3' is provided with a relay coil 20' and a movable contact 21' actuated thereby. The movable contact 21' is connected to the connecting point between resistors 102 and 103 connected in series, whose both ends are connected to a power source 14 in parallel with the resistor 13a. In addition, the movable contact 21' is actuated by the relay coil 20' to make contact with any of the change-over contacts of the capacitors 106a to 106d of the low-pass filter 3', thereby suitably settling the time constant of the low-pass filter 3'.

With the use of the sensitive control device employing such a low-pass filter 3', the autopilot does not respond to the variations in the deviation $(\theta-\theta_i)$ of those periods which exceed a certain value. That is, the time constant of the low-pass filter is suitably selected to ensure accomplishment of steering operations of only those periods which the ship can answer. In short, steering operations of short periods can be eliminated, so that useless steering operations can be eliminated in a manner similar to that in the foregoing example. In this case, it is also possible to select the time constant of the low-pass filter by varing the resistance value of the resistor 101.

Generally, lowering of the sensitivity of an amplifier, a relay and the like causes a decrease in the response level. In this case, the zone lower than the response level may be called a dead zone. Therefore, these devices can also be used as the sensitive control device of this invention.

Furthermore, the combined use of the sensitive control device shown in FIGURE 6 with that depicted in FIGURE 2 or 4 can further eliminate useless steering operations.

According to this invention, the number of the steering operations is detected in relation to time and the dead zone band of the dead-zone circuit 3 is established based upon the detected signal, as has been described in the foregoing, so that the establishment of the dead zone band or the weather adjustment can be automatically accomplished suitably in accordance with the conditions of the sea. This effectively avoids wear of the helm and minimizes the fluid resistance of the ship due to the unnecessary rudder movement and the snake action of the ship, thus ensuring economization of the navigation.

In the foregoing the sensitive control device is inserted between the detector-converter 2 and the adder 4 but it may be inserted between the adder 4 and the amplifier circuit 5. Further, the relays may be replaced by semiconductor switches or the like.

It will be apparent that many modification and variations may be effected without deparing from the scope of the novel concepts of this invention.

I claim as my invention:

1. In marine automatic pilot system having means for producing an electrical signal corresponding to a deviation of a ship heading from a set course, control means with an insensitive range actuated by the electrical signal of a value exceeding a predetermined value, an amplifier circuit supplied with outputs of said control means and representative of the number of steering operations, and a servo motor controlled by the output of said amplifier circuit, the improvement comprising first means supplied with one portion of the output of said amplifier circuit and producing an electrical signal corresponding to the number of steering operations in relation to time, and second means controlled by outputs of said first means to automatically control said control means, said amplifier circuit having relay action, said first means, second means, said control means and amplifier circuit forming a control loop.

2. A marine automatic pilot system as claimed in claim 1, wherein said control means with an insensitive range is a dead-zone circuit and said first means is an electric counted, said dead-zone circuit being controlled by said second means.

3. A marine automatic pilot system as claimed in claim 1, wherein said first means is an electrical counter and said control means is an electrical filter, said filter being controlled by said second means.

4. A marine automatic pilot system as claimed in claim 1, wherein the first means consist of a pair of capacitors connected in parallel, one electrode of one of said capacitors being connected to one of the output terminals of said amplifier circuit, one electrode of the other of said capacitors being connected to the other of the output terminals of said amplifier circuit, each of said capacitors allowing passage of an electrical signal in accordance with the number of the steering operations, a diode, the anode of which is commonly connected to the other electrodes of said capacitors, another capacitor to which the cathode of said diode is connected, the last mentioned capacitor accumulating charges passing through first mentioned capacitors and the diode, another diode, the cathode of which is connected to the connection point of said first mentioned diode and said pair of capacitors and the anode of which is connected to said second mentioned capacitor, for preventing the last mentioned capacitor from discharging, and a potentiometer connected across the terminals of the last mentioned capacitor, the adjustable terminal of the potentiometer being connected to the second means for controlling the system.

5. A marine automatic pilot system as claimed in claim 1, wherein said control means comprise two diodes connected in reverse polarity and in parallel relation to each other, two resistors each connected in series with the respective diodes, and the second means comprise a D.C. power source, a variable resistor connected across the D.C. power source and relay means for controlling the operative position of the variable resistor by changing the movable contact thereof, the movable contact of the variable resistor and one terminal of the D.C. power source being respectively connected to the connection points of the diodes and two resistors.

6. A marine automatic pilot system as claimed in claim 1, wherein said control means is a low-pass filter consisting of a resistor-capacitor network and the second means consist of a relay for adjusting the time constant of the low-pass filter.

References Cited

UNITED STATES PATENTS

| | | |
|---|---|---|
| 3,133,520 | 4/1964 | Bentkowsky et al. |
| 3,149,270 | 9/1964 | Smyth et al. |
| 3,221,238 | 11/1965 | Unger et al. |
| 3,280,781 | 10/1966 | Koerner _____ 318—20.225 X |
| 3,310,721 | 3/1967 | Moller. |

THOMAS E. LYNCH, Primary Examiner

U.S. Cl. X.R.

114—144; 318—448, 489

UNITED STATES PATENT OFFICE
CERTIFICATE OF CORRECTION

Patent No. 3,505,577                     Dated April 7, 1970

Inventor(s)   YOICHI HIROKAWA

It is certified that error appears in the above-identified patent and that said Letters Patent are hereby corrected as shown below:

Column 3, line 7, "circuit" should read --dead--.

Column 7, line 4, "respective" should read --respectively--;

line 20, before "which" insert --by--.

Column 8, line 51, "3' " should read --3a'--.

Signed and sealed this 31st day of August 1971.

(SEAL)
Attest:

EDWARD M. FLETCHER, JR.
Attesting Officer

WILLIAM E. SCHUYLER, JR.
Commissioner of Patents